(12) United States Patent
Geisz (10) Patent No.: US 10,320,049 B2
(45) Date of Patent: Jun. 11, 2019

(54) ANNULAR DIRECTIONAL COUPLER, IN PARTICULAR FOR MICROWAVE-BASED DISTANCE SENSORS

(71) Applicant: Balluff GmbH, Neuhausen (DE)

(72) Inventor: József Geisz, Veszprém (HU)

(73) Assignee: Balluff GmbH, Neuhausen (DE)

( * ) Notice: Subject to any disclaimer, the term of this patent is extended or adjusted under 35 U.S.C. 154(b) by 26 days.

(21) Appl. No.: 15/712,451

(22) Filed: Sep. 22, 2017

(65) Prior Publication Data

US 2018/0090810 A1 Mar. 29, 2018

(30) Foreign Application Priority Data

Sep. 23, 2016 (DE) .................. 10 2016 118 025

(51) Int. Cl.
| | |
|---|---|
| H01P 5/18 | (2006.01) |
| H01P 5/22 | (2006.01) |
| G01S 7/40 | (2006.01) |
| G01S 13/04 | (2006.01) |
| G01S 13/36 | (2006.01) |
| G01V 3/12 | (2006.01) |
| H01P 5/04 | (2006.01) |
| G01S 7/03 | (2006.01) |

(52) U.S. Cl.
CPC ............. H01P 5/188 (2013.01); G01S 7/034 (2013.01); G01S 7/40 (2013.01); G01S 13/04 (2013.01); G01S 13/36 (2013.01); G01V 3/12 (2013.01); H01P 5/04 (2013.01); H01P 5/222 (2013.01)

(58) Field of Classification Search
CPC ............... H01P 5/18; H01P 5/22; H01P 5/222
USPC .......................................................... 333/109
See application file for complete search history.

(56) References Cited

U.S. PATENT DOCUMENTS

| | | | | |
|---|---|---|---|---|
| 2,796,586 A * | 6/1957 | Goldstein | ................. | H01P 5/04 333/120 |
| 4,316,160 A * | 2/1982 | Dydyk | ................... | H01P 5/222 330/287 |
| 7,639,102 B2 * | 12/2009 | Wagner | .................. | H03H 7/461 333/101 |
| 8,629,734 B2 * | 1/2014 | Corum | ..................... | H03H 7/18 333/109 |

(Continued)

FOREIGN PATENT DOCUMENTS

DE 10 2009 055 363 A1 6/2011

OTHER PUBLICATIONS

K. Al-Shamaileh et al., "Miniaturized 3 dB Branch-Line Hybrid and Rat-Race Couplers with Harmonics Suppression Using Capacitively-Loaded Transmission Lines", International Journal of Microwave and Optical Technology 7(6), Nov. 2012, total of 4 pages.

(Continued)

*Primary Examiner* — Dean O Takaoka
(74) *Attorney, Agent, or Firm* — Collard & Roe, P.C.

(57) ABSTRACT

An annual directional coupler having at least three taps, which are each arranged relative to one another around routes having a wavelength difference of ¼ of a wave guide wavelength, includes in particular at least two branch lines, wherein a first branch line has at least three taps and wherein the at least second branch line does not have any taps and is supplemented by an additional route corresponding to the wave guide wavelength.

5 Claims, 8 Drawing Sheets (56) References Cited

U.S. PATENT DOCUMENTS

2012/0262356 A1* 10/2012 Nguyen ............... H01Q 13/20
343/772

OTHER PUBLICATIONS

K. Al-Shamaileh et al., "Compact Tunable 3 dB Hybrid and Rat-Race Couplers with Harmonics Suppression" International Journal of Microwave and Optical Technology 7(6), Nov. 2012, pp. 372-379.

* cited by examiner

ANNULAR DIRECTIONAL COUPLER, IN PARTICULAR FOR MICROWAVE-BASED DISTANCE SENSORS

CROSS REFERENCE TO RELATED APPLICATIONS

Applicant claims priority under 35 U.S.C. § 119 of German Application No. 10 2016 118 025.4 filed Sep. 23, 2016, the disclosure of which is incorporated by reference.

BACKGROUND OF THE INVENTION

1. Field of the Invention

The invention is based on a directional coupler, in particular suitable for microwave-based distance sensors.

2. Description of the Related Art

A microwave-based distance sensor having a directional coupler emerges from DE 10 2009 055 363 A1 and serves, among other things, to determine the position of a piston arranged in a piston cylinder. A microwave transmission signal is coupled or fed into or uncoupled from a conductor structure by means of the directional coupler. Here, the microwave transmission signal is irradiated in a frequency band in a cylinder space in front of the piston, wherein the frequency band is chosen in such a way that at least two different modes that are dependent on the position are induced. The resonance frequencies of the at least two modes are determined, wherein the position of the piston is determined from the resonance frequencies. The length of this cylinder space and thus the piston position can be clearly determined by the measurements at the at least two modes, which are dependent on position.

A broadband excitation of the two modes enables an evaluation of the measuring signals with high resolution. As a result of the excitation of a basic mode that is independent of the position of the piston, the dielectric constant of a medium in the cylinder space, e.g. of a hydraulic oil present there, can also be determined. As a result, an exact position determination can be carried out with a dielectric constant that is not inherently known or with a temporal change of the dielectric constant.

The frequency band of the irradiated transmission signal ranges up to about 20 GHz and varies from a lower cut-off frequency to this upper frequency. Below the cut-off frequency, microwaves cannot propagate in the respective wave guide. This critical frequency corresponds to a so-called threshold wavelength.

A circular directional coupler concerned here (so-called "Rat-Race coupler") emerges, for example, from the publication "Miniaturized 3 db Branch-Line Hybrid and Rat-Race Couplers with . . . ", K. Al-Shamaileh et al., appearing in November 2012 in the International Journal of Microwave and Optical Technology 7(6), pages 372-379. This circular directional coupler that is also suitable for relatively low operational frequencies of below 10 GHz can be implemented in the form of strip conductors by means of microstrip technology miniaturised to a circuit board (PCB). This directional coupler has four taps or ports, wherein adjacent ports are each arranged in an upper ring half at a wave length difference of λg/4 relative to one another.

SUMMARY OF THE INVENTION

The circular directional coupler according to the invention has a switch arrangement having two branch lines, namely a first branch line having taps mentioned above and a second branch line without such taps. The second branch line without the taps is supplemented here by an additional route that corresponds to said wave guide wavelength λg.

For reasons of size, the λg/4 routes of the directional coupler that are provided in the directional coupler and are mentioned above as well as said λg additional routes which are mentioned above can be implemented by T-pads or "C-loaded transformer" components. These T-pads each have a capacitor between the wave guide and the ground potential (GND). The directional coupler is tunably realised by means of these capacitors. This tunable realisation has the advantage that the same switch arrangement (or switch layout) can be used for several frequencies or piston diameters.

The directional coupler according to the invention enables the realisation of distance sensors concerned here, which are particularly suitable for pistons having small piston diameters of e.g. about 50 mm.

The switch arrangement of the circular directional coupler that matches different piston diameters additionally offers a simple and cost-effective production of the directional coupler or a distance sensor having this.

Since a circuit board having the directional coupler proposed according to the invention is also equipped with different electronic components and the circuit board must also have bores at its disposal for mechanical reasons, the directional coupler is preferably arranged on the edge of the circuit board.

With the directional coupler according to the invention, it can further be provided that the additional routes corresponding to the wave guide wave length λg are calculated by means of a Mo matrix for a lossless wave guide and the matrix product Mo=$M_x M_c M_x$. The matrix product Mo can here be formed by means of a first transfer matrix for the lossless wave guide of the shape $$M_x = \begin{bmatrix} A_x & B_x \\ C_x & D_x \end{bmatrix} = \begin{bmatrix} \cos\theta_x & jZx\sin\theta_x \\ jZ_x^{-1}\sin\theta_x & \cos\theta_x \end{bmatrix}$$

and by means of a second transfer matrix $$M_c = \begin{bmatrix} A_c & B_c \\ C_c & D_c \end{bmatrix} = \begin{bmatrix} 1 & 0 \\ j\omega C & 1 \end{bmatrix}$$

taking a capacitor into consideration.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
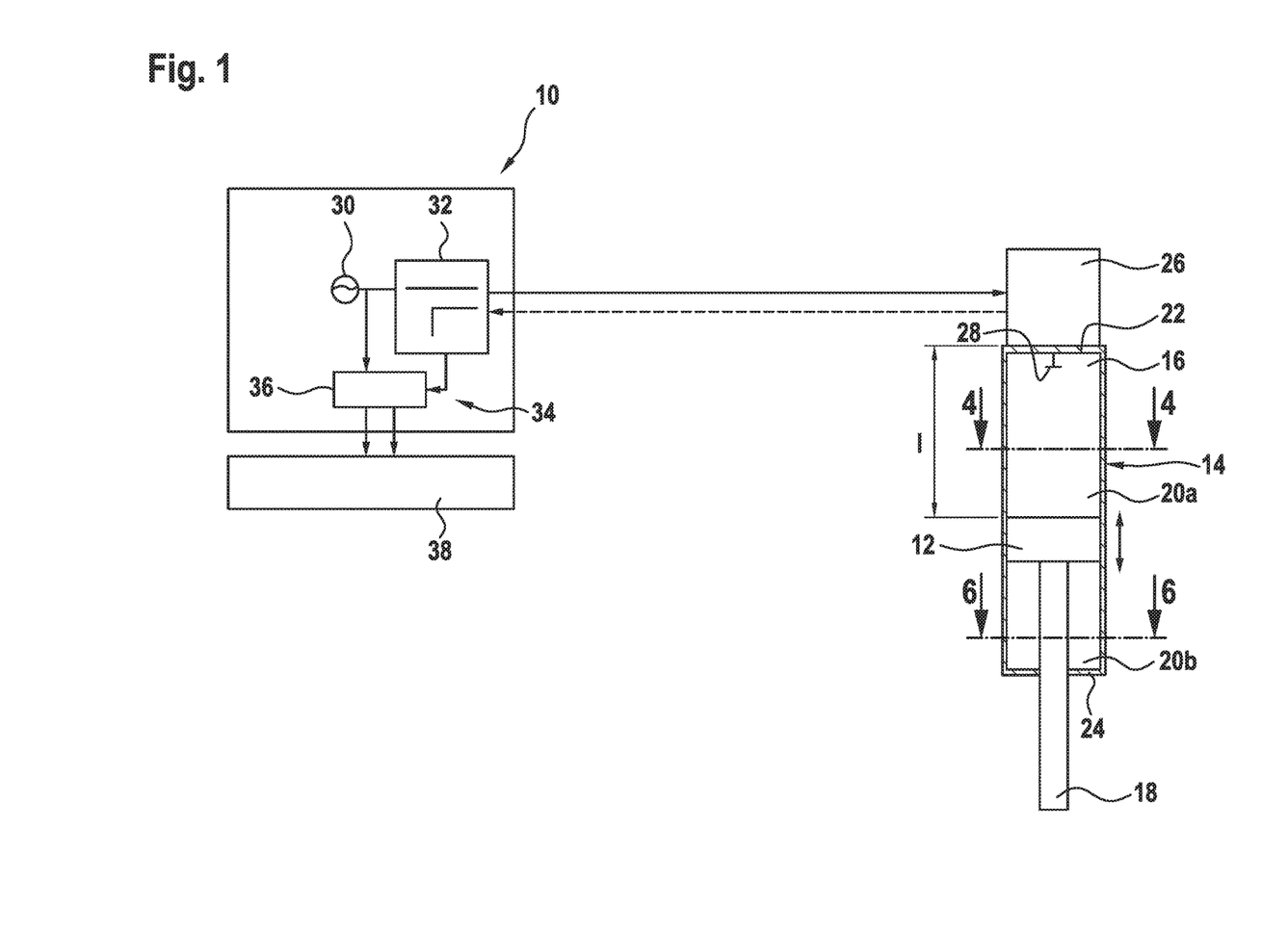
FIG. 1 schematically shows a microwave sensor device for determining the position of a piston arranged in a piston cylinder, according to the prior art.

A microwave sensor device 10 that is shown in FIG. 1 and is known from DE 10 2009 055 363 A1 serves to determine the position of a piston 12 of a piston cylinder 14. The piston cylinder 14 here has a cylinder space 16 in which the piston 12 can be moved. The cylinder space 16 is here filled with a medium, namely, in the case of a pneumatic cylinder, with air and, in the case of a hydraulic cylinder, with hydraulic oil. A piston rod 18 is arranged on the piston 12, whereby a first subspace 20a and a second subspace 20b are formed. The subspace 20a is in front of the piston 12 in the region in which the piston rod 18 is not arranged. When the piston cylinder 14 is cylindrical, the first subspace 20a has a hollow-cylindrical shape. The second subspace 20b is passed through by the piston rod 18, it thus has an annular cylindrical shape.

The microwave sensor device 10 serves to determine the position I of the piston 12, e.g. in relation to an end face 22 of the first subspace 20a or in relation to the end face 24 of the second subspace 20b. A coupling probe device 26 is arranged on the piston cylinder 14, by means of which coupling probe device 26 microwave radiation is coupled into the cylinder space 16 by means of an antenna 28. Correspondingly, microwave radiation can also be uncoupled by means of the coupling probe device 26. A piston cylinder, which has a hinge eye, has a hollow-cylindrical subspace 20a and an annular-cylindrical subspace 20b. The microwave measurement can be carried out at the subspace 20a and/or at the subspace 20b. A synchronized cylinder has two piston rods, wherein the local subspaces are both formed to be annular cylindrical and wherein the microwave measurement can be carried out at one or both of these circular-cylindrical subspaces.

The microwave sensor device 10 also comprises a source device 30 which provides microwave radiation in one frequency band. Broadband microwave radiation can be coupled or irradiated into the cylinder space 16 by means of the source device 30. The frequency band for the broadband coupling ranges, for example, between 4 GHz and 8 GHz or between 4 GHz and 10 GHz and extends, for example for the subspace 20a (hollow cylindrical subspace), from a cut-off frequency up to a technically possible frequency, such as 10 GHz for example.

The microwave sensor device 10 comprises, in particular, a directional coupler 32 which is coupled or connected to the source device 30, on the input side, and to the coupling probe device 26 on the output side. Microwave radiation provided by the source device 30 is delivered as a transmission signal of the coupling probe device 26 for coupling into the cylinder space 16 by means of the directional coupler 32. Furthermore, receiving signals provided by the cylinder space 16 are received via the directional coupler 32 and forwarded for evaluation (reflected microwave energy).

The microwave sensor device 10 further comprises an evaluation device labelled as a whole by 34, which carries out an evaluation for determining the piston position I. The evaluation device 34 determines, in particular, the necessary information from a mode structure of individual modes in the cylinder space 16 and carries out the corresponding calculations for determining the piston position I. The evaluation device 34 comprises a determination device 36 for the resonance frequencies of modes in the cylinder space 16. The determination device 36 here determines the resonance frequency from the amplitude and/or the phase of the receiving signal (wherein the phase is determined in comparison to the transmission signals). It is fundamentally possible here that the determination of the resonance frequency is determined only from the amplitude, only from the phase or both from the amplitude and the phase. A calculating unit 38 of the evaluation device 34 then calculates, in particular, the piston position I or determines this by means of a comparison to data determined in a reference measuring (see below).

Figure 2A:
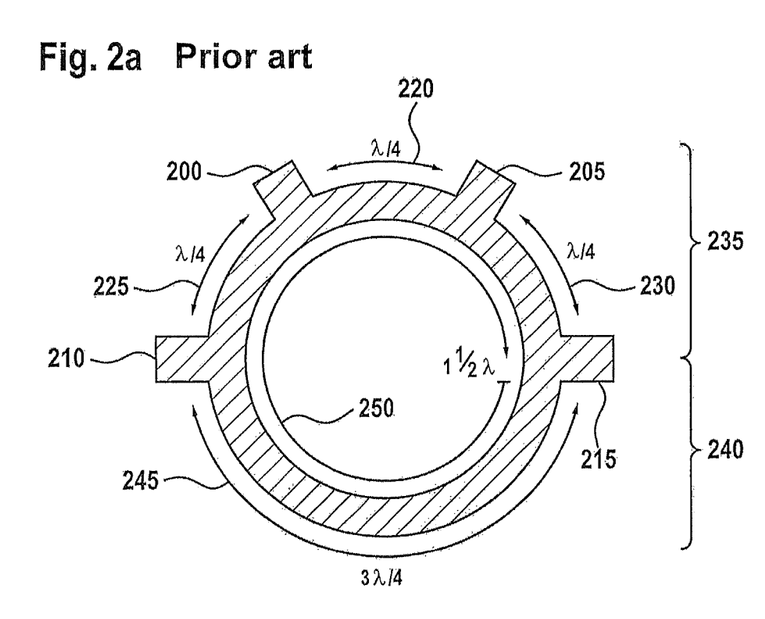
FIGS. 2a and 2b show a circular directional coupler ("rat-race coupler) according to the prior art, namely a principal switch arrangement (FIG. 2a) and a typical electronic switch arrangement (FIG. 2b) of a circular directional coupler miniaturized in the manner mentioned.

A conventional circular directional coupler known in the prior art is schematically depicted in FIG. 2a. This directional coupler has four taps or ports 200, 205, 210, 215, wherein adjacent ports are each arranged in the upper ring half 235 at a wave length difference of λ/4 relative to one another 220, 225, 230. The lower half of the ring 240 comprises a wavelength region of 3λ/4 or ¾λ (reference numeral 245). The whole ring has a characteristic impedance which differs by the factor 1.41 from the impedance of the ports 200-215. In total, the directional coupler covers an angle region of 1.5λ (reference numeral 250) and thus this coupler covers a considerable part of the total switching, in particular at low operational frequencies.

Figure 2B:
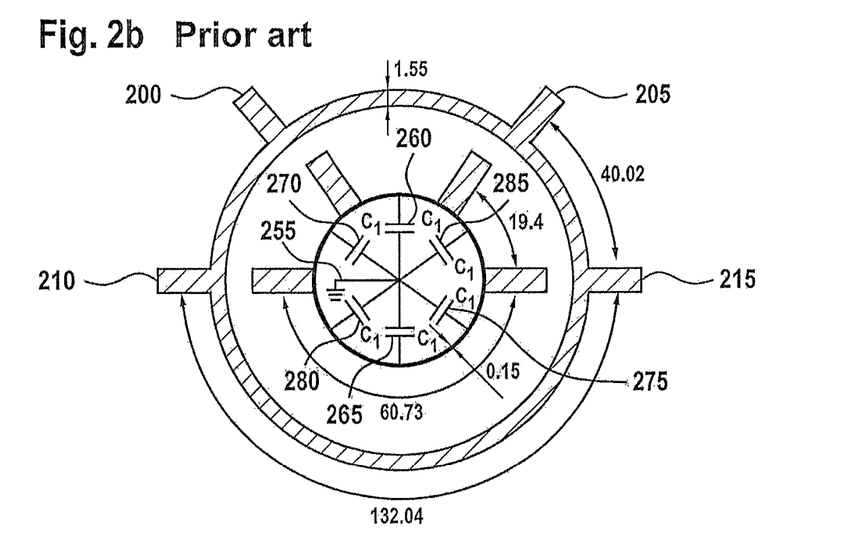

In the embodiment of the directional coupler shown in FIG. 2a, said embodiment being shown in FIG. 2b and also being inherently known, each of the three λ/4 converters 220-230 shown in FIG. 2a is replaced in each case by two capacitors 260 and 265, 270 and 275 as well as 280 and 285 that are arranged with respect to ground 255. This replacement serves not only to reduce the total construction size of the directional coupler in relation to said miniaturising, but it also causes an effective suppression of the unequal harmonics of the switch-induced base frequency.

Assuming a characteristic impedance Z0 of 50Ω, an FR4 substrate having a relative permeability of 4.6, a loss tangent of 0.02, a substrate thickness of 1.6 mm and an operational frequency of 1 GHz, a capacitive structure for the region is generated by means of predetermining a value 25° for the subsequently described phase shifting ex of the converter. The values Zx=151.64Ω and C=1.76 pF emerge from the subsequently stated equations (1) to (6). For said substrate, a microstrip width of 0.15 mm having a corresponding physical strip length of 9.63 mm emerges from the value for Zx.

With a sensor device concerned here, a rat-race coupler that is mentioned at the start and is implemented in (miniaturized) microstrip technology is used as the directional coupler. This directional coupler is formed to be circular, wherein the length of the corresponding circumference is 1.5*λg. Since the diameter of the substrate or the required HF-capable circuit board is mostly set in advance, there are frequency regions in which the conventional rat-race coupler cannot be implemented for the reasons stated above. Then, in an arrangement of a microwave-based directional coupler shown in FIG. 1 in a hydraulic cylinder, this functions as a microwave wave guide. With such wave guides, there is a lower frequency limit (cut-off frequency) that has already been mentioned above, below which the microwaves are not capable of propagating in the wave guide. With the content concerned here, the smallest piston diameter is 50 mm, wherein the corresponding lower frequency limit for the TM01 mode used is 3.09 GHz. The upper frequency limit at which the nearest mode (TE21) can also propagate, is 1.27*fc=3.92 GHz. It follows from this data that the operational frequency should be about 3.5 GHz.

For said HF circuit board, inherently known "Rogers 4003" material is used. The wavelength for the microstrip wave guide for this material at 3.5 GHz is 52.7 mm. The diameter of a conventional rat-race coupler would be 25.17 mm at this frequency. Since different components (ICs, resistors, capacitors, . . . ) are placed on the circuit board and this also, for mechanical reasons, is equipped with bores, the directional coupler is preferably arranged on the edge of the circuit board. The calculated diameter of 25.17 mm would indeed be too small for this since a rat-race coupler having such a diameter would lead to spatial problems when assembling with the ICs and to collision problems with mechanical components.

To solve said problem, the directional coupler described below has two branch lines, namely a first branch line having taps (or ports) shown in FIGS. 2a and 2b and a second branch line without such taps. Here, the second branch line (without taps), in particular, is supplemented by an additional route corresponding to the λg length. Such an additional route does not cause any phase shifting and also has no electrical effect on the directional coupler in the lossless case. However, this additional route advantageously increases the diameter of the directional coupler, and that is to say with inherently unchanged electrical parameters. For reasons of size, the λg/4 wave guide route of the directional coupler shown in FIGS. 2a and 2b and said λg additional routes are implemented by T-pads (C-loaded transformer). These T-pads each have a capacitor between the wave guide and the ground potential (GND). The directional coupler is tunably realized by means of these capacitors. This tunable realisation has the advantage that a given switch layout can be used for several frequencies or piston diameters.

The directional coupler subsequently drafted in detail having said two branch lines is defined by so-called "ABCD parameters", which are extensively described in the publication mentioned at the start by K. Al-Shamaileh et al. in chapter II "Capacitively-Loaded Transmission Line Design" and which are subsequently correspondingly used in the design of a directional coupler according to the invention.

Figure 3A:
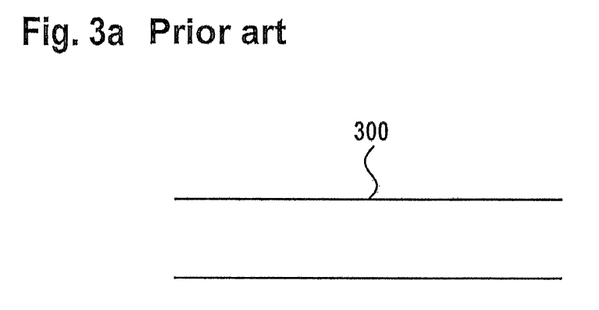
FIGS. 3a and 3b schematically show exemplary wave guide structures used in the prior art in a known manner for a directional coupler concerned here.
Figure 3B:
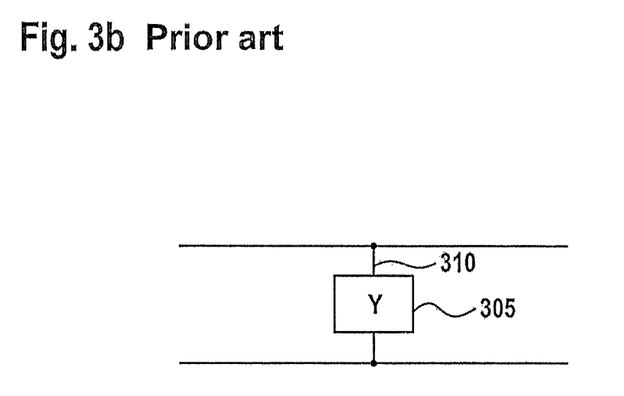

In the case of an ideal or lossless wave guide 300 that is schematically depicted in FIG. 3a, the ABCD parameters are defined by the following matrix equations (for the wave transfer):

$$\begin{bmatrix} A & B \\ C & D \end{bmatrix} = \begin{bmatrix} \cos\beta l & jZ_0 \sin\beta l \\ jZ_0^{-1}\sin\beta l & \cos\beta l \end{bmatrix} \quad (1)$$

wherein the value Z0 of said characteristic impedance and the product β*l of the values β and l correspond to said electrical length of the wave guide. In the case of a wave guide having an admittance 305 corresponding to a complex conductance Y shown in FIG. 3b, the following emerges for the values of the transfer matrix shown in equation (1):

$$\begin{bmatrix} A & B \\ C & D \end{bmatrix} = \begin{bmatrix} 1 & 0 \\ Y & 1 \end{bmatrix} \quad (2)$$

Figure 4A:
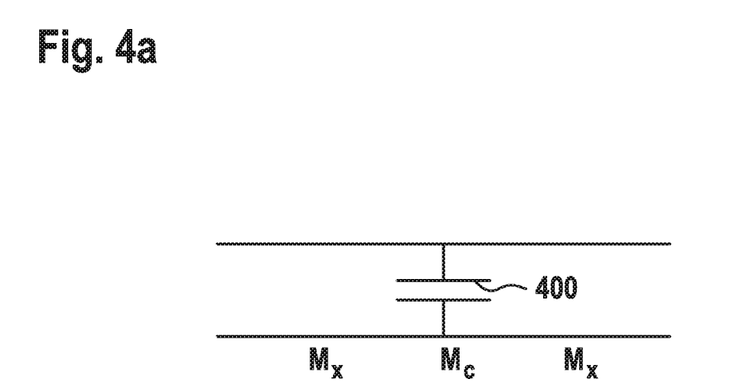
FIGS. 4a and 4b schematically show an exemplary embodiment of a wave guide structure suitable for a directional coupler according to the invention.

If a capacitor 400 shown in FIG. 4a is used in the cross branch 310 of the admittance Y 305 shown in FIG. 3b, the following transfer matrix emerges for the corresponding parameters Ac, Bc, Cc and Dc:

$$M_c = \begin{bmatrix} A_c & B_c \\ C_c & D_c \end{bmatrix} = \begin{bmatrix} 1 & 0 \\ j\omega C & 1 \end{bmatrix} \quad (3)$$

For the ABCD parameters of a lossless λg/4 wave guide route (i.e. with β*l=) 90°, the following transfer matrix emerges from equation (1):

$$M_0 = \begin{bmatrix} A_0 & B_0 \\ C_0 & D_0 \end{bmatrix} = \begin{bmatrix} \cos 90° & jZ_0 \sin 90° \\ jZ_0^{-1}\sin 90° & \cos 90° \end{bmatrix} \quad (4)$$

Figure 4B:
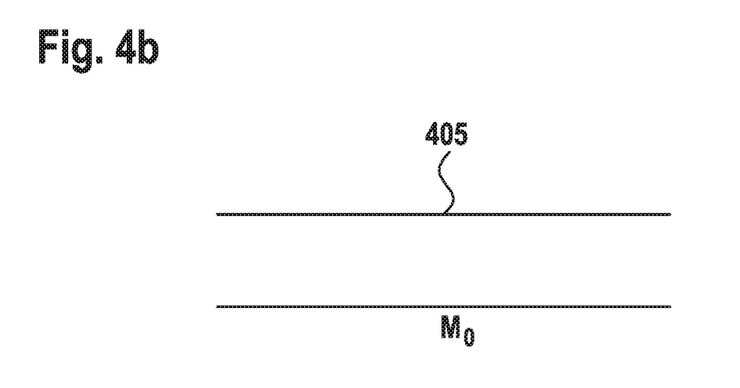

Based on the values of M0 (see FIG. 4b) for a lossless wave guide 405 according to equation (4) and Mc (see FIG. 4a) according to equation (3), the λg/4 wave guide routes present in an annular directional coupler according to prior art is replaced by the wave guide structures shown in FIGS. 4a and 4b, wherein the following equation (5) emerges for the transfer matrix:

$$M_x = \begin{bmatrix} A_x & B_x \\ C_x & D_x \end{bmatrix} = \begin{bmatrix} \cos\theta_x & jZx \sin\theta_x \\ jZ_x^{-1}\sin\theta_x & \cos\theta_x \end{bmatrix} \quad (5)$$

It should be noted that the λg/4 routes and thus the $M_0$ matrix shown in equation (4) are here replaced by the matrix product $M_x M_c M_x$ and, that is to say, according to the relation $M_0 = M_x M_c M_x$ The parameters of the wave guide and the capacitance value of the wave impedance Zx emerging in each case from the wave guide structure can be calculated using equations (3) to (5), and, that is to say, according to the following three relation:

$$Z_x = \frac{Z_0}{\tan\theta_x}; \quad C = \frac{2\tan\theta_x}{\omega Z_0 \tan(2\theta_x)}; \quad 2\theta_x < 90° \quad (6)$$

A directional coupler suitable for a piston diameter of 50 mm, for example, can be calculated from the equations in (6). If the directional coupler is operated, for example, with an operating frequency of 3.5 GHz, with the diameter of the directional coupler of 36 mm that is possible with a diameter of the circuit board of 38.9 mm, an arc length of the directional coupler of $K=D*\pi=113$ mm emerges. As the material for the circuit board, "Rogers 4003" distributed by Rogers Corporation, Connecticut, USA having a substrate thickness of 0.2 mm is used, which results in an effective relative permittivity $\varepsilon r,eff$ (=dielectric conductivity) of $\varepsilon r,eff=2,645$ for a wave guide produced from this material in microstrip technology.

With the directional coupler calculated in this way, a branch of the directional coupler is thus supplemented by a wave guide route of the length $\lambda g$, wherein this supplemented route is formed from $\lambda g/4$ wave guide routes combined with simplified electronic elements corresponding to the inherently known "lumped parameter" theory. Here, the directional coupler consists of a total of twenty wave guide routes x, wherein the length of an individual route according to said arc length K amounts the value $x=K/20=5.655$ mm. With the simplified elements, in each case it is assumed that all guide connections or guide paths for the electric connection of the individual switching circle components, for example, are assumed to be ideal and thus have or contribute no electric conductive resistance.

With said operating frequency of 3.5 GHz, the characteristic wavelength $\lambda g$ of the wave guide amounts to $\lambda g=52.7$ mm. Said phase shifting of the converter $\theta x$ of $\theta x=\beta*x=(2\pi/\lambda g)*x=0.679$ rad=$38.9°$ and thus a wave impedance $Zx$ of the wave guide of the T-pad of $Zx=Z0/\tan\theta x=87.6\Omega$ result from this. The capacitance value emerging therefrom for the capacitors arranged in the cross branch is thus $C=2/(\omega*Zx*\tan(2*\theta x))=0.22$ pF.

The directional coupler calculated in such a way is tunable by means of said capacitance value and thus the exact formation or dimensions of the (rat-race) directional coupler described can be geometrically adjusted in a simple manner to a HF (high frequency) circuit board of a given distance sensor. Possible exemplary embodiments of the directional coupler are stated in the following table.

TABLE

Exemplary embodiments of the directional coupler

| D [mm] | 50 | 60 | 63 | 70 | 80 |
|---|---|---|---|---|---|
| F [GHz] | 3.5 | 2.9 | 2.8 | 2.5 | 2.25 |
| C [pF] | 0.22 | 0.47 | 0.51 | 0.65 | 0.78 |

Figure 5:
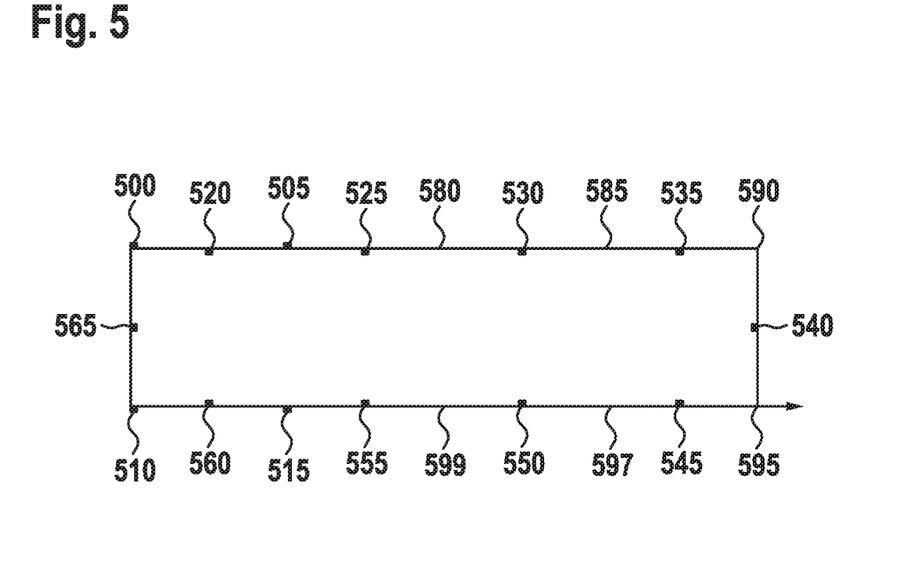
FIG. 5 schematically shows a first exemplary embodiment of a directional coupler according to the invention simulated by means of a model calculation.

In the model of a simulated directional coupler according to the invention, schematically shown in FIG. 5, said directional coupler being simulated with the Software ANSYS HFSS ("HFSS" is the name for a wave equation simulation), a rectangular directional coupler is assumed, rather than a circular one. In the underlying model there, the wave propagation is described in the individual conductor structures of a substrate by complex scattering parameters.

In this model calculation, the directional coupler, on the one hand, has first taps or ports 500, 505, 510, 515 that are directed outwardly and that represent said four ports. In addition, pads 520-565 of said capacitors directed towards the inside of the switching circuit are depicted, wherein so-called "lumped" capacitors emerge at points 520, 525, 530, 535, 540, 545, 550, 555, 560, 565. The actual capacitor components are not visible in FIG. 5; however, they are defined in said software as so-called "lumped port boundaries". Said T-pad represents, for example, the routes between the two points 505 and 520, the capacitor at point 520, and the route between the two points 520 and 500. Seen in a clockwise direction, there are routes between the two points 505 and 515 which are $1.75*\lambda g$ long in total. Said additional $\lambda g$ routes can also be found here.

The part of the directional coupler that is connected to said ports comprises the routes 515-510, 510-500 and 500-505. These three routes represent a length of $\frac{3}{4}*\lambda g$. The part of the directional coupler that does not have any taps comprises the routes 505-580, 580-585, 585-590, 590-595, 595-597, 597-599, 599-515. As a result, a total of seven T-pads emerge (instead of three T-pads), which represent a length of $7/4*\lambda g$ or $1+\frac{3}{4}*\lambda g$. Any four routes can be determined or set as additional routes from these seven routes.

Figure 6A:
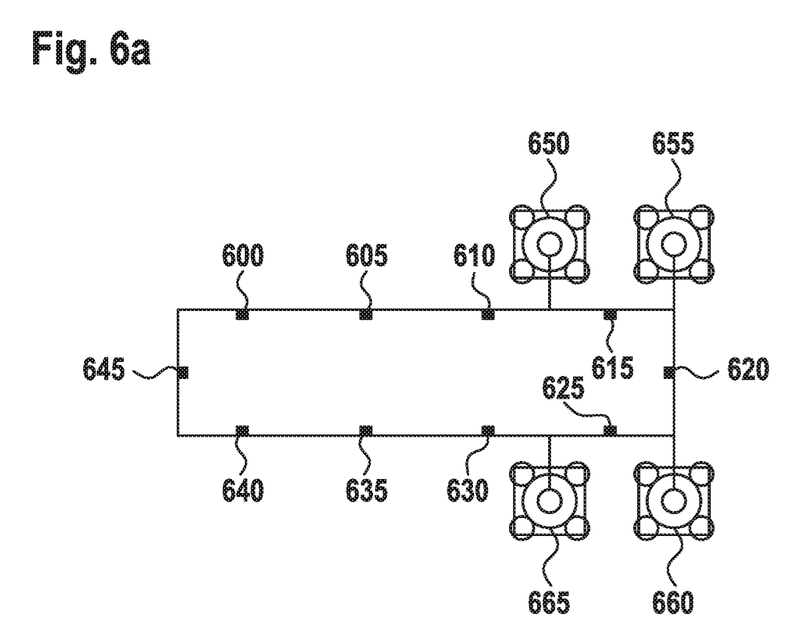
FIG. 6a shows a variant of a simulated directional coupler implemented on a circuit board (PCB), wherein this directional coupler was measured by a "network analyzer"

FIG. 6a schematically shows an implementation of a simulated directional coupler that is based, as described, on a rectangular arrangement of the components on a circuit board (PCB). The implementation of the directional coupler shown comprises ten capacitors 600, 605, 610, 615, 620, 625, 630, 635, 640, 645 arranged to be directed towards the inside of the switching circuit and four ports 650, 655, 660, 665 that are directed outwardly. The routes between the two taps 650 and 615, the capacitor 615 (C120) and the routes between the two taps 655 and 615 here represent said T-pad. The routes arranged in a clockwise direction between points 665 and 650 are $1.75*\lambda g$ long in total. Said additional $\lambda g$ routes can also be found here.

The directional coupler is implemented by means of inherently known "Johanson" capacitors, i.e. multi-layer ceramic capacitors by the manufacturer Johanson Technology, which have a relatively low ESR and relatively high Q factors and, as a result, cause a lower power loss and correspondingly lower heat formation. Here, ESR is the abbreviation for "Equivalent Series Resistance" which is the name for the internal loss resistance of a capacitor. Then the internal resistance is unwanted because of its losses, wherein the Q factor corresponds to the reciprocal value of the corresponding loss factor. The capacitors used additionally have a tolerance of 0.1 pF.

Figure 6B:
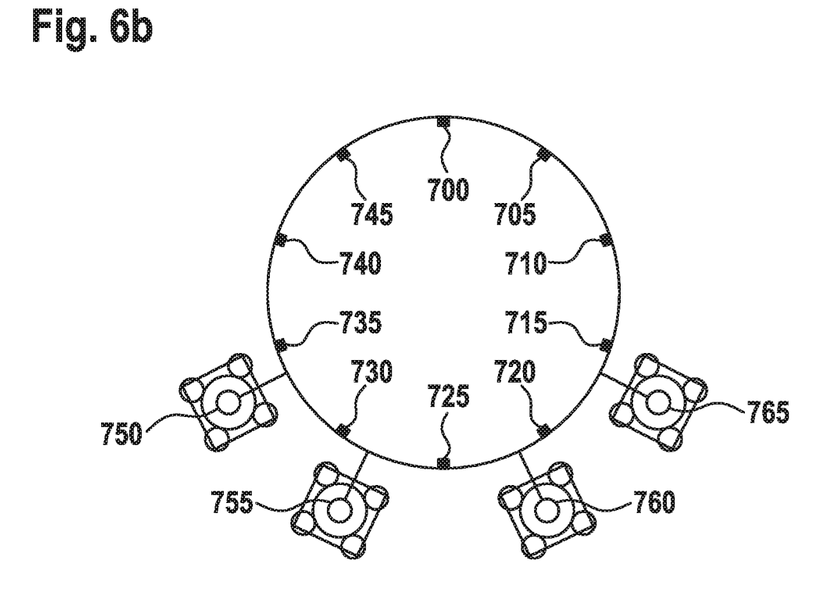
FIG. 6b shows a variant of a directional coupler realized in a sensor implemented on a circuit board (PCB), wherein this directional coupler was measured by a "network analyzer"

FIG. 6b schematically shows the directional coupler already described after installation in a distance sensor concerned here. Presently, it is, however, a circular version of the directional coupler shown in FIG. 6a. The directional coupler, in turn, comprises ten internally arranged capacitors 700-745 and four outwardly arranged taps 750-765. In this exemplary embodiment, the directional coupler is also implemented by means of said Johanson capacitors, which also have a tolerance of 0.1 pF.

Figure 7A:
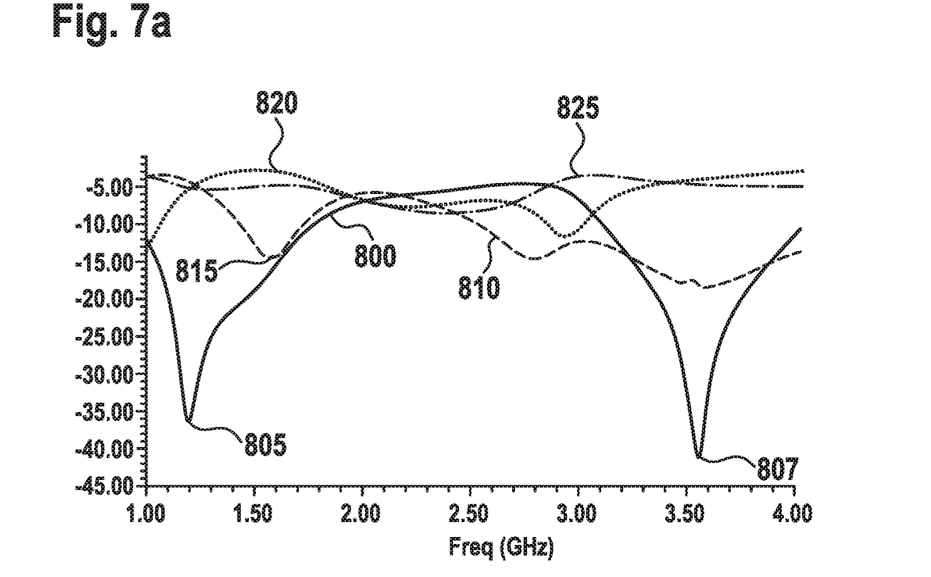
FIG. 7a shows the result of the simulation for the directional coupler shown in FIG. 5.

FIG. 7a shows simulation results of the directional coupler depicted in FIG. 5. The simulation results are, in particular, attenuation curves etc., depending on the radiation frequency in [GHz], which emerge with the directional coupler shown in FIG. 5 that is operated in steps in a frequency range of 1.00 to 4.0 GHz. In the directional coupler, the capacitors each amount to 0.2 pF. The measuring curves 800 and 810 show the attenuation properties of a microwave irradiated in a piston cylinder present as an example, and that is to say in the blocking direction of the wave. In particular, the measuring curve 800 shows the insulation attenuation between the transmitting and receiving inputs of the directional coupler. The measuring curve 810 shows the parameter s11 which corresponds to a reflection factor of the directional coupler transmitter input. Furthermore, the measuring curve 820 shows a reflection wave generated in the piston cylinder, and the measuring curve 825 shows the attenuation properties of a correspondingly irradiated microwave between the transmitter output and the radiator (presently the "antenna") in the passthrough direction of the wave, i.e. in the blocking direction of the directional coupler. Thus, the microwaves emitted by the transmitter reach this attenuation in a piston cylinder 14 shown in FIG. 1.

The attenuation curve 800 has clear decreases at two points 805, 807 which are caused by said wave superposition. Correspondingly, an exemplary signal drop 815 also emerges for the two attenuation curves 810. The clear differences in the size of the signal drops 805, 807 and 815 are evoked, as described below.

The operating properties of a rat-race coupler concerned here is substantially determined by wave superposition, since the operation of the coupler is based on the running of said waves. Because of the geometry shown, the waves can occur at individual ports in counter phase and thus mutually extinguish one another. Such an extinction takes place, for example, in the regions 805 and 807. However, the signal drop at 805 is less meaningful, since the corresponding frequency, and that is to say about 1.2 GHz, does not occur in the present coupler. The curve 800, on the other hand, shows the reflection factor (parameter 's11') at port 515. In a present "microstrip" wave guide, the wave impedance and thus the reflection factor are dependent on the frequency. Thus, this directional coupler is dimensioned to 3.5 GHz. At about 3.5 GHz (at point 807), a sufficiently large reflection factor is present since the emerging reflection is only relatively small. Because of the present structure of the coupler, only a relatively low reflection can form, also with a different frequency, such as at point 805 shown, for example.

Figure 7B:
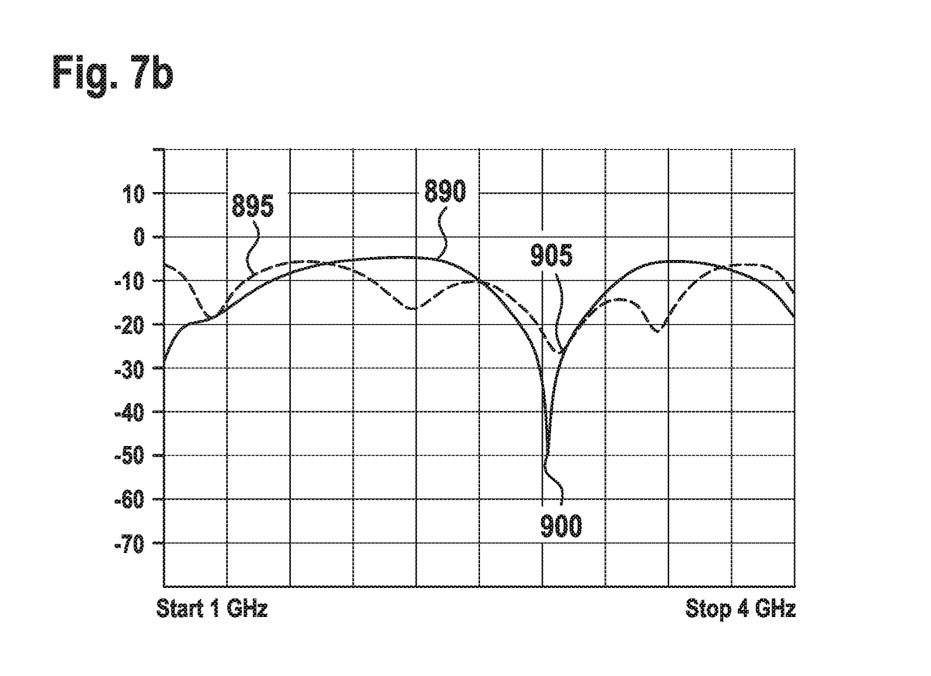
FIGS. 7b-7d show measuring results for the directional coupler shown in FIGS. 6a and 6b.

FIG. 7b shows measuring results for the directional coupler depicted in FIG. 6a that are received by means of a "ZVA8 vector network analyzer". Here, the measuring curve 900 represents the insulation between transmitter and receiver path at the operating frequency and the measuring curve 905 represents the parameter s11 (reflection factor) mentioned above. The curves 890 and 895 are not considered here since they lie outside the operational range. The directional coupler was tuned by means of the 0.5 pF capacitors in such a way that 2.8 GHz emerge, for example, for the operational frequency.

The measuring results shown, i.e. attenuation curves depending on the radiation frequency in [GHz], emerge with the directional coupler shown in FIG. 6a that is, in turn, operated in steps in a frequency range of 1.00 to 4.0 GHz. With the directional coupler, the capacitors presently amount to 0.5 pF in each case. The measuring curves 890 and 895 show the attenuation properties of a microwave irradiated in a piston cylinder present by way of example. The attenuation curve 890 has a clear decrease at point 900 which, in turn, is caused by said wave superposition. Correspondingly, an exemplary signal drop 905 also emerges for the two attenuation curves 895. The clear differences in the size of the signal drops 900, 905, as described in the following, are evoked.

It should be noted that the reflection factor (parameter s11) is actually described by means of the curve 895 and the desired optimum of the reflection is achieved at point 905.

The curve 890 represents the insulation attenuation between the transmission and receiving paths. The functioning principle of the rat race coupler is based on the phase shifting of the waves that emerge because of the different running lengths. At point 900, the waves mutually extinguish one another such that the transmitter and the receiver cannot "see" each other. The frequency at point 900 (and point 905) corresponds to the operating frequency of a sensor with a piston diameter of 60 mm.

Figure 7C:
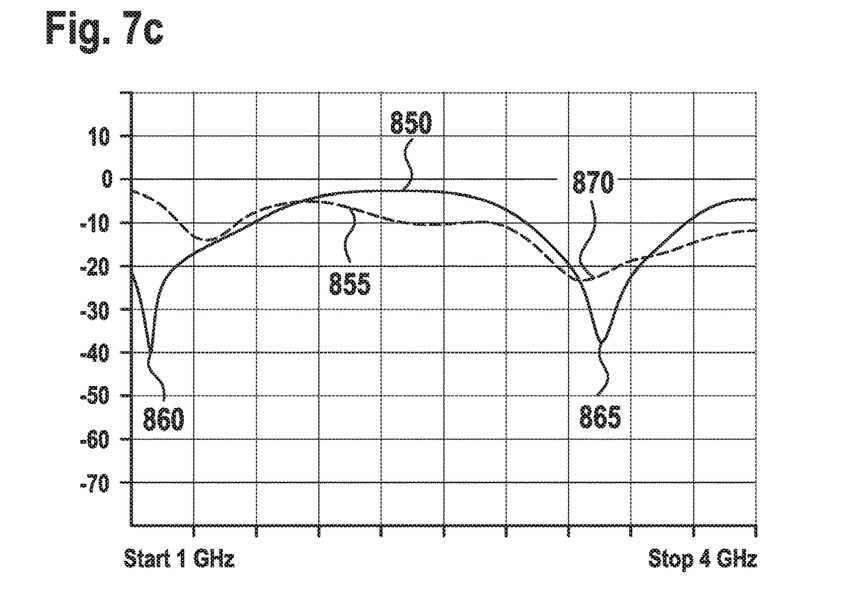
Figure 7D:
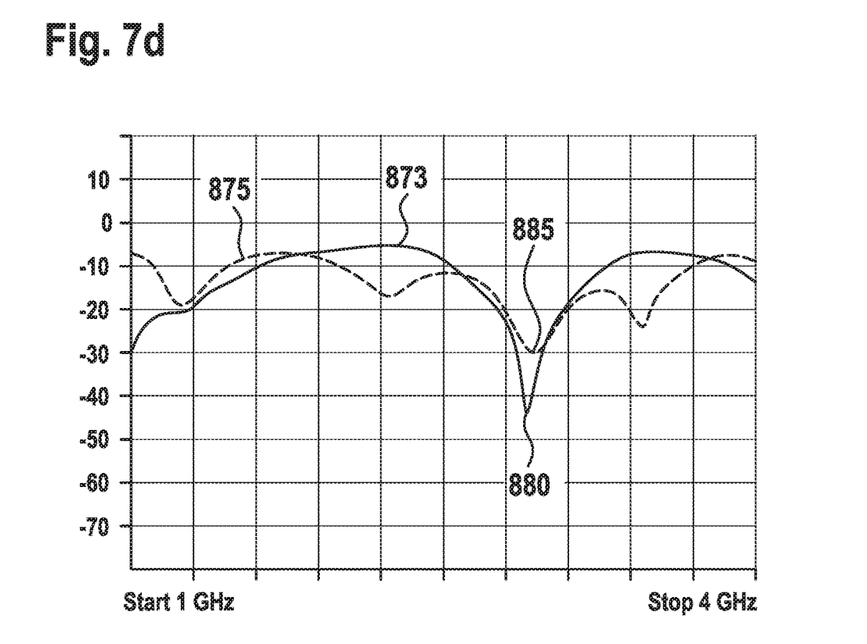

Measuring results for the directional coupler depicted in FIG. 6b that are received by means of said analyzer are shown in turn in FIGS. 7c and 7d. Here, the points or regions relevant to the operation of the directional coupler are the insulation attenuation and the reflection properties 865, 870, 880 and 885. The other points, in turn, lie outside the operating region and are thus not presently considered as well.

The measuring results shown, i.e. attenuation curves depending on the radiation frequency in [GHz], emerge in the directional coupler shown in FIG. 6b that is in turn operated in steps in a frequency range of 1.00 to 4.0 GHz. In the directional coupler, the capacitors in FIG. 7c amount to 0.2 pF and in FIG. 7d to 0.5 pF. The measuring curves 850 or 873 and 855 or 875 show the attenuation properties of a microwave irradiated in a piston cylinder present by way of example. The attenuation curves 850 and 873 have a clear decrease at points 865 and 880 which, in turn, is caused by said wave superposition. Correspondingly, exemplary signal drops 870, 885 also emerge for the two attenuation curves 855, 875. The clear differences in the size of the signal drops 865 and 870 or 880 and 885 are evoked, as described below.

The situation present here is similar to that in FIG. 7b. The curves 850 and 873 represent the insulation attenuation between the transmission and the receiving paths. With the operation frequencies corresponding to points 865 or 880, the waves mutually extinguish one another such that the receiver and the transmitter are well shielded or insulated from each other in terms of signals. In turn, the reflection factor (parameter s11) is described by curves 855 and 875. The optimum of the reflection factor is presently achieved to be close to the operating frequencies at points 870 and 885.

Although only a few embodiments of the present invention have been shown and described, it is to be understood that many changes and modifications may be made thereunto without departing from the spirit and scope of the invention.

What is claimed is:

1. An annular directional coupler having at least three taps which are each arranged relative to one another around routes having a wavelength difference of ¼ of a wave guide wave length, comprising at least two branch lines,
   wherein a first branch line has at least three taps;
   wherein the at least second branch line does not have any taps and is supplemented by an additional route corresponding to the wave guide wavelength; and
   wherein the routes arranged relative to one another between the taps having a wavelength difference of ¼ of the wave guide wavelength and the additional routes are formed by T-pads.

2. The directional coupler according to claim 1, wherein the T-pads each have a capacitor between a wave guide and a ground potential.

3. The directional coupler according to claim 2, wherein the directional coupler is tunably formed by means of the capacitors.

4. The directional coupler according to claim 1, wherein the additional routes corresponding to the wave guide wavelength are calculated by means of a Mo matrix for a lossless wave guide and the matrix product $Mo=M_x M_c M_x$.

5. The directional coupler according to claim 4, wherein the matrix product Mo is formed by means of a first transfer matrix for the lossless wave guide of the shape $$M_x = \begin{bmatrix} A_x & B_x \\ C_x & D_x \end{bmatrix} = \begin{bmatrix} \cos\theta_x & jZx\sin\theta_x \\ jZ_x^{-1}\sin\theta_x & \cos\theta_x \end{bmatrix}$$

and by means of a second transfer matrix $$M_c = \begin{bmatrix} A_c & B_c \\ C_c & D_c \end{bmatrix} = \begin{bmatrix} 1 & 0 \\ j\omega C & 1 \end{bmatrix}$$

that takes a capacitor into consideration.

* * * * *